Feb. 27, 1951
E. L. CLARK
2,543,719
DEFLECTION CIRCUIT
Filed July 29, 1949
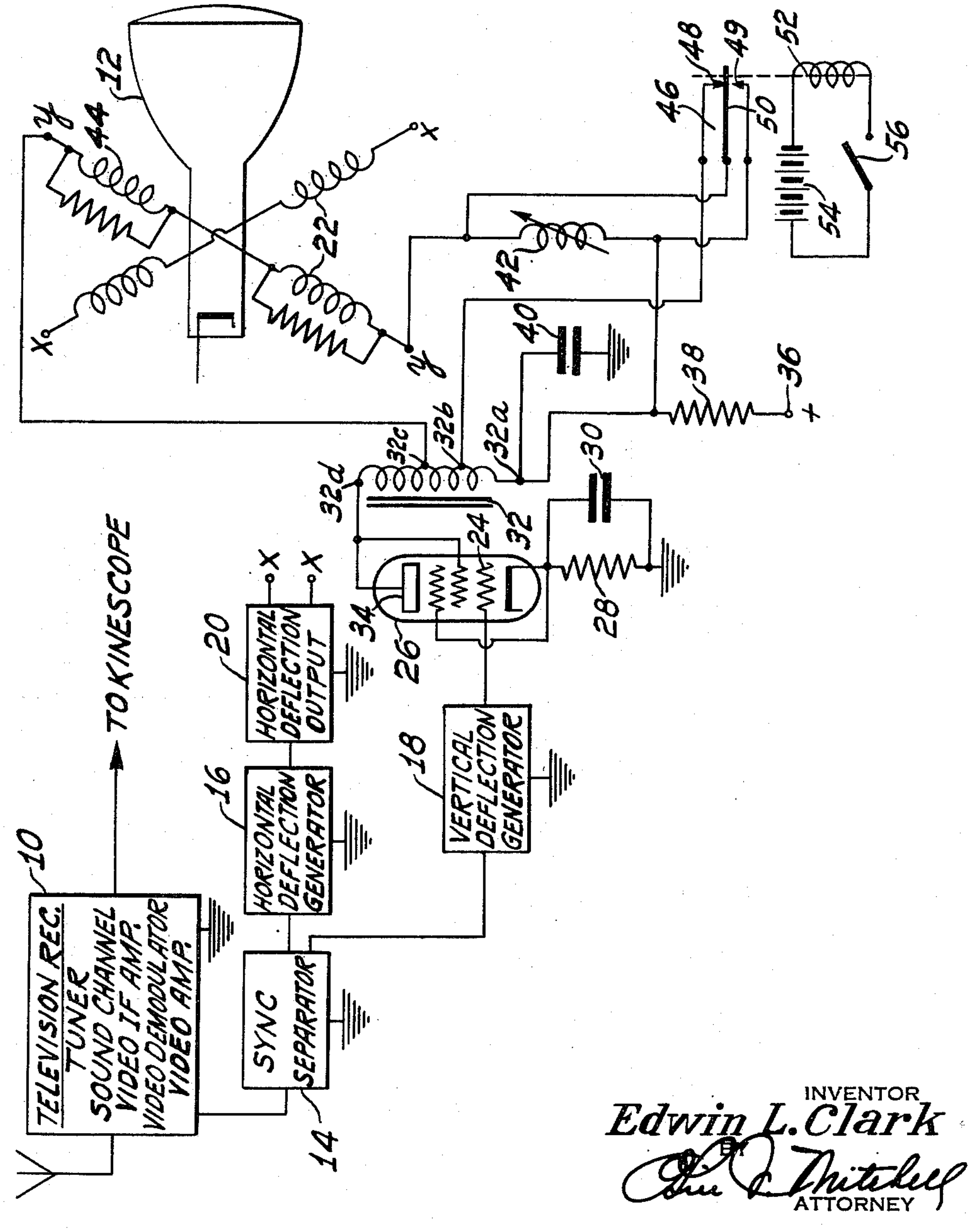
INVENTOR
Edwin L. Clark
BY
ATTORNEY Patented Feb. 27, 1951 2,543,719

UNITED STATES PATENT OFFICE 2,543,719

DEFLECTION CIRCUIT

Edwin L. Clark, Collingswood, N. J., assignor to Radio Corporation of America, a corporation of Delaware Application July 29, 1949, Serial No. 107,438

11 Claims. (Cl. 315—27)

The present invention relates to electromagnetic deflection circuits particularly of the type suitable for use with cathode ray equipment such as, for example, cathode ray kinescope.

In more particularity, though not necessarily exclusively, the present invention is concerned with a form of deflection circuit which features a novel amplitude control of the developed deflection influence.

The present invention deals more directly with a novel form of deflection circuit suitable for use in television receiver equipment wherein it it desirable to provide a conveniently controllable arrangement for selectively providing at least two predetermined deflection amplitudes in order that the form of picture detail produced on the television receiver screen may be immediately changed at will. The image may be in the form of a picture or other subject matter.

Present-day television broadcasting techniques make available to users of television receivers picture signals representing television views whose composition is under the sole control of the studio cameramen and technicians handling the broadcast. The user of a television receiver therefore is forced to be content with the composition of the transmitted picture substantially as it appears in the raster produced by his television receiver. If, for example, a particular portion of the television scene is of greater interest to him than others, the receiver owner has prior to this invention had no convenient and readily accessible means at his disposal for magnifying or otherwise inspecting more closely this particular portion of the received picture without incurring the expense of optical devices.

As will be appreciated by those skilled in the television art, television viewing rasters, according to present standards, are formed by the action of an illuminated point or spot being swept over a viewing surface concomitantly in both the horizontal and vertical direction. Normally, deflection circuits for the spot, which spot is commonly produced by the action of a cathode ray beam impinging on a fluorescent screen, are adjusted so that the virtual extremities of spot deflection, in both the vertical and horizontal direction, are so restricted such that the generated raster coincides with a predetermined viewing area usually defined by an opening in an otherwise opaque mask. It is therefore possible by increasing the amplitude of the deflection in both the horizontal and vertical direction so that the spot is deflected well beyond the limits of the predetermined and, in some instances, restricted viewing area to make the picture information falling within the area appear greatly magnified just as though the camera scanning the object were moved much closer to the object. Inasmuch as the picture detail transmitted, due to a limit in the bandwidth allotted to each television transmitter, remains substantially constant and the detail of the simulated "close-up" view thereby is in fact reduced, it has been found that a very useful "close-up" effect having a high entertainment value is provided by such deflection amplitude control.

It will be appreciated that to obtain this "close-up" viewing in television receivers by the use of increased deflection amplitudes, considerable strain is imposed on deflection circuit arrangements designed for ordinary deflection work. It is usually considered sufficient in the employment of this "close-up" viewing principle to provide an expansion capability of the horizontal and vertical deflection circuits in the order of 15% to 25%. In practice, it is found that due to the changing loading effects on the output discharge tube providing the deflection signal at the required levels of deflection, the waveform of the deflection varies considerably thereby producing objectionable distortion in the picture when in its normal position. The deflection system is designed for maximum efficiency in its "close-up" position. When the loading is improper as in the normal position, distortion results.

It is therefore a purpose of the present invention to provide a novel, simple and economical deflection circuit eminently suited for use in television receivers in which it is desired to provide conveniently accessible control of the deflection amplitudes by discrete levels to obtain the effect of "close-up" viewing of the television image.

It is another purpose of the present invention to provide a new and improved electromagnetic deflection circuit for a cathode ray beam wherein a plurality of predetermined discrete deflection levels are to be made instantly available such that the loading and distortion effects on the output vacuum tube generating the deflection signals are held substantially constant for all amplitudes of developed signal.

In order to realize the above objects, the present invention in its more general form contemplates the use of an electromagnetic coupling device between the output discharge tube and the electromagnetic deflection yoke. The output coupling device is provided with a plurality of output impedance taps whereby the amplitude of signal applied to the deflection yoke may be selected. A correcting impedance is then provided which is connected through the action of a selective switch across a predetermined portion of the coupling device output when the deflection yoke is connected for maximum amplitude excitation. The correcting impedance, which, in accordance with the invention, may be in the form of an inductance, is assigned a value such that the change in the loading on the output electron discharge tube is substantially constant, thereby maintaining the waveform of the deflection signal virtually constant, for all amplitudes of generated yoke deflection current.

A more detailed understanding of the operation of the present invention, as well as other objects, advantages and features, will become more apparent in the reading of the following specification especially when taken in connection with the accompanying drawing in which:

The figure illustrates one form of the present invention as applied to a typical television receiver arrangement.

Referring now to the figure, there is indicated in block form at 10 a number of the components of a conventional television receiver such as, for example, the R. F. tuner which includes a superheterodyned mixer, an oscillator, the associated sound channel, and the video intermediate frequency amplifier, which latter is followed by a video demodulator and video amplifier. The output of the video amplifier is indicated for connection with the control electrode of an image reproducing tube such as, for example, the kinescope 12. Typical circuit arrangements suitable for use in the block 10, as well as other receiver components hereinbefore and hereinafter to be described in block form, are more fully illustrated in an article by Antony Wright entitled "Television Receivers" appearing in the March 1947 issue of the RCA Review.

In accordance with conventional television receiver design, a portion of the received demodulated video signal is applied to a sync signal separator circuit shown at 14, which develops at its output, horizontal and vertical sync signals for control of the horizontal and vertical deflection signal generators shown at 16 and 18. The horizontal deflection signal generator is adapted for driving the horizontal deflection output stage 20 whose output signal is in turn made available at terminals X—X intended for connection with the horizontal deflection coil terminals X—X of the deflection yoke 22. Correspondingly, the output of the vertical deflection signal generator 18 is applied for excitation of the grid 24 of the vertical output discharge tube 26. As indicated, conventional cathode bias for the vertical output stage is provided by means of cathode resistor 28 by-passed by the capacitor 30.

It will be understood by those skilled in the art that maximum usefulness of the invention, as applied to television viewing from the standpoint of observation of detail, or apparent detail of the enlarged portion of the image, will be obtained by some accompanying suitable increase in the horizontal component of image deflection.

In accordance with the present invention a transformer, which may, for example, be an autotransformer 32 provided with taps 32*a*, 32*b*, 32*c* and 32*d* is connected between the anode 34 of the output discharge tube and a source of positive plate supply having a terminal as indicated schematically at 36. A suitable decoupling resistor 38, with an associated by-pass capacitor 40, is provided in accordance with general circuit practice well known to those skilled in the art. In further accordance with the present invention, an inductance 42 is used in conjunction with the vertical deflection winding 44 of the yoke 22, and the combination of the winding 44 and inductance 42 placed in shunt across taps 32*a* and 32*c* of the autotransformer 32. Switch 46 is then provided, having contacts 48 and 49 with a movable contact which may be in the form of a relay tongue or armature 50 illustrated in the normal or regular deflection amplitude position. The armature 50 may be, as shown, actuated by an electromagnetic relay coil 52 adapted for energization from a power source 54 through the control of push-button switch 56. This described arrangement provides for remote control in a simple and effective manner. The showing of the power source 54 is illustrative only, and it is understood that any convenient source may readily be adapted for use. The armature 50 of the switch is connected with the upper end of inductance 42, while the contacts 48 and 49 are respectively connected with taps 32*b* and 32*a* of the autotransformer 32.

In the operation of the circuit shown, it may be seen that in the normal position of the switch 50, as illustrated, the vertical deflection coil 44 is connected across that portion of the transformer between taps 32*c* and 32*b* and thus it receives its normal amplitude of deflection current, inductance 42 being connected between 32*a* and 32*b* to provide proper loading for deflection tube 26. However, upon closing of push-button switch 56, thereby energizing the coil 52 and bringing the armature 50 of switch 56 into contact with 49 and separated from contact 48, the vertical deflection coil 44 is connected through the armature 50 and contact 49 across that portion of the autotransformer 32 residing between taps 32*a* and 32*c*, and inductance 42 is removed from the circuit. Obviously, if the circuit loading and overall operating conditions of the output discharge tube 26 remain the same, the amplitude of current passing through the coil 44, now being across a greater portion of the autotransformer 32, will be greater and thus result in an increased amplitude of beam deflection in the kinescope 12.

In order to achieve this balance between the normal (as illustrated) and increase amplitude or "close-up" operating condition of the deflection circuit, the inductance 42, provided in accordance with the present invention, is selected so that the output impedance presented to the discharge tube 26 is the same in the normal position with the yoke 44 connected across the taps 32*c* and 32*b* as when the yoke is connected across taps 32*c* and 32*a*. Its action in this respect is accomplished by means of the switch 46 which places the inductance 42 across taps 32*b* and 32*a* of the autotransformer during normal or reduced amplitude deflection operation thereby supplementing the load of the deflection yoke 44 and reducing the load impedance imposed on the output tube 26. However, in the expanded or "close-up" sweep deflection position of the switch 46, the inductance 42 is completely shorted out by the armature 50 and contact 49, thereby, as hereinbefore described, placing the deflection coil 44 across the entire autotransformer secondary residing between taps 32*a* and 32*c*. This latter connection, of course, reduces the primary to secondary turns ratio of the autotransformer and reflects a composite impedance into the plate circuit of the output discharge tube 26 which is substantially equal to that obtained through the combined action of the winding 44 and the inductance 42 with the switch 46 in its normal position.

In order to maintain the load on the deflection tube virtually constant and thereby minimize changes in the contour of the deflection waveform as a result of the switching action, the Q of the inductance 42 must be properly chosen in accordance with the overall operating losses of the circuit when the circuit is switched to its expanded range or "close-up" operating mode. The exact value of the inductance 42, as well as its Q, which is equal to $$Q-\frac{2\pi fL}{R_e}$$

where:

$f$=the frequency of deflection circuit operation,
L=the inductance value,
$R_e$=the effective resistance, including all losses of the inductor, will therefore be different for various circuit applications. The taps 32*b*, relative to the entire secondary from 32*a* to 32*c*, may also find various positions depending upon the desired change in deflection amplitude and the actual turns ratio of the output transformer arrangement employed. It is generally desirable to design the deflection circuit to provide maximum efficiency in its expanded amplitude mode thereby minimizing the maximum load on the television set power supply system.

Solely by way of example, it has been found that with a 10 to 1 primary to secondary autotransformer ratio, the tap 32*b* may be conveniently connected at approximately 30% of the secondary turns with the inductance L having a value of approximately 10 mh. with an effective resistance of 11 ohms. These values are, of course, merely exemplary and will be understood to in no way limit the practice of the present invention.

It is to be further understood that the present invention is in no way limited to use in vertical deflection circuits of television receivers. Principles involved in the present invention may well find application to horizontal deflection circuits as well as vertical deflection circuits with of course appropriate damping arrangements being necessary in the case of the horizontal deflection frequencies. Moreover, it may be desirable to provide the facility of the present invention in television equipments other than receivers as, for example, studio monitors, and the like. Evidently, the present invention could be successfully used in the expansion of beam deflection in radar equipment, teleran, shoran and other like equipments employing electron beam deflection.

Having thus described my invention, what I claim is:

1. In a controllable amplitude electron beam deflection circuit employing an output discharge tube and an electromagnetic deflection yoke, the combination of, an electromagnetic coupling device connected for coupling between the output circuit of said discharge tube and said deflection yoke, said coupling device having an output winding with a plurality of impedance taps thereon, deflection amplitude control switching means for selectively and alternatively placing said deflection yoke across two impedance taps embracing a relatively low impedance or two winding taps embracing a relatively high impedance, and an impedance element connected with said switching means such that said impedance element is switched across two impedance taps on said output winding only during the switched application of said deflection yoke to said two impedance taps embracing a low impedance.

2. Apparatus according to claim 1 wherein said impedance element is of such characteristics so as to maintain a substantially constant load on said output discharge tube regardless of the switched position of said deflection yoke.

3. Apparatus according to claim 1 wherein said impedance element is substantially inductive in nature and of such a valve as to maintain the loading on said output discharge tube substantially constant regardless of the switched position of said deflection yoke.

4. In an electromagnetic deflection circuit employing an output discharge tube and an electromagnetic deflection yoke, the combination of, an autotransformer directly connected in the output circuit of said output discharge tube, said autotransformer being supplied with a plurality of impedance taps, switching means for selectively placing said deflection yoke either in shunt with two impedance taps embracing a predetermined larger portion of said autotransformer winding or in shunt with two impedance taps embracing a smaller portion of said autotransformer winding, and an impedance element also connected with said switching means such that said impedance element is switched in shunt with two designated autotransformer impedance taps only during the switched application of said deflection yoke to said autotransformer terminals embracing said predetermined portion of said autotransformer winding.

5. Apparatus according to claim 4 wherein said impedance element is substantially inductive and of such a value as to maintain the loading on said output discharge tube substantially constant regardless of the switched connection of said deflection yoke.

6. Apparatus according to claim 4 wherein said switching means is of the single-pole double throw variety having an armature and a first and second contacts and wherein said deflection yoke is supplied with two input terminals, a connection between a first tap on said autotransformer and one terminal of said deflection yoke, a connection from the other terminal of said deflection yoke and the armature of said switching means, a connection from a second tap on said autotransformer to the first contact of said switching means, a connection from a third tap on said autotransformer and the second contact of said switching means, the autotransformer winding turns embraced between said first and second taps being less than the autotransformer winding turns embraced between said first and third taps, and a connection placing said impedance element between the second contact of said switching means and the armature of said switching means.

7. Apparatus according to claim 6 wherein there is additionally provided an electromagnetically actuated means for positioning said armature either in contact with said first contact or said second contact.

8. In an electromagnetic cathode ray beam deflection circuit employing an output discharge tube and an electromagnetic deflection yoke having input terminals thereon, the combination of, an electromagnetic coupling unit having its input connected with the output circuit of said output discharge tube and its output connected with the input terminals of said deflection yoke, said coupling unit output having a plurality of output impedance levels, switching means for selecting the output impedance level applied to said deflection yoke, an impedance element connected with said switching means for selective shunt connection with an impedance level of said coupling unit output, the value of said impedance element being so chosen to maintain the load on said electron discharge tube substantially constant regardless of the impedance level to which said deflection yoke is switched.

9. A deflection circuit for producing a plurality of selectively available deflection amplitudes in cathode ray beam deflection apparatus employing an electron discharge tube having an anode and an electromagnetic deflection yoke having at least a first and second input terminals, said circuit comprising in combination, an autotransformer having at least a first winding tap designatable as an impedance datum with a second, third and fourth winding taps defining progressively higher impedance positions on said winding relative to said first tap, a connection between said discharge tube anode and said fourth winding tap of said autotransformer, a power supply terminal of positive polarity connected with said autotransformer first winding tap and an inductance element connected in series with the terminals of said deflection yoke to form a combination, connections placing said deflection yoke and inductance combination in shunt with the first and third terminals of said autotransformer winding, amplitude control switching means connected with the second terminal of said autotransformer and two points on said inductance element, said switching means being such to selectively and alternately connect the point on said inductance element nearest said deflection yoke with either the second autotransformer winding tap or said first autotransformer winding tap.

10. Apparatus according to claim 9 wherein said switching means comprises a single-pole double throw switch employing an armature with a first and second contact on either side of said armature and wherein said connections to said switching means are such that said armature is connected with the point on said inductance nearest said deflection yoke, said first contact connected with said autotransformer second winding tap and said second contact connected with the other point on said inductance element.

11. Apparatus according to claim 10 wherein said single-pole double throw switching means comprises an electromagnetically operable relay, said relay having an actuating winding and means for conditionally energizing said relay winding.

EDWIN L. CLARK.

REFERENCES CITED

The following references are of record in the file of this patent:

UNITED STATES PATENTS

| Number | Name | Date |
|---|---|---|
| 2,165,815 | Rhea | July 11, 1939 |
| 2,223,990 | Holmes | Dec. 3, 1940 |
| 2,253,864 | Muller | Aug. 26, 1941 |
| 2,265,620 | Bahring | Dec. 9, 1941 |
| 2,414,939 | Fitch | Jan. 28, 1947 |